(12) United States Patent
Haynes

(10) Patent No.: US 6,868,676 B1
(45) Date of Patent: Mar. 22, 2005

(54) TURBINE CONTAINING SYSTEM AND AN INJECTOR THEREFOR

(75) Inventor: Joel Meier Haynes, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 116 days.

(21) Appl. No.: 10/326,580

(22) Filed: Dec. 20, 2002

(51) Int. Cl.⁷ .............................. F02C 7/22; F02C 7/26
(52) U.S. Cl. .............................. 60/776; 60/740; 60/746
(58) Field of Search .................... 60/776, 733, 736, 60/737, 740, 805, 739, 747, 746, 723, 761

(56) References Cited

U.S. PATENT DOCUMENTS

| | | | |
|---|---|---|---|
| 2,726,511 A | * 12/1955 | Pitt ............................ 60/739 |
| 3,871,063 A | * 3/1975 | Halvorsen .............. 29/890.143 |
| 3,934,409 A | * 1/1976 | Quillevere et al. ............ 60/749 |
| 4,028,888 A | * 6/1977 | Pilarczyk ..................... 60/798 |
| 4,193,260 A | * 3/1980 | Carlisle et al. ................ 60/737 |
| 4,887,425 A | * 12/1989 | Vdoviak ....................... 60/761 |
| 4,910,957 A | 3/1990 | Moreno et al. ............ 60/39.06 |
| 4,928,481 A | 5/1990 | Joshi et al. ................... 60/737 |
| 4,955,191 A | 9/1990 | Okamoto et al. ............ 60/39.3 |
| 5,036,657 A | * 8/1991 | Seto et al. ............... 60/39.281 |
| 5,069,029 A | 12/1991 | Kuroda et al. ............. 60/39.06 |
| 5,201,181 A | 4/1993 | Ohmori et al. ................ 60/737 |
| 5,285,628 A | 2/1994 | Korenberg ................. 60/39.05 |
| 5,372,008 A | 12/1994 | Sood ............................ 60/737 |
| 5,442,922 A | 8/1995 | Dyer et al. .................... 60/739 |
| 5,551,228 A | 9/1996 | Mick et al. ................ 60/39.06 |
| 5,603,906 A | 2/1997 | Lang et al. .................. 422/182 |
| 5,611,682 A | 3/1997 | Slavejkov et al. ............. 431/8 |
| 5,623,819 A | 4/1997 | Bowker et al. ............ 60/39.06 |
| 5,647,215 A | * 7/1997 | Sharifi et al. .................. 60/737 |
| 5,688,115 A | 11/1997 | Johnson .......................... 431/9 |
| 5,718,573 A | 2/1998 | Knight et al. ................ 431/354 |
| 5,836,164 A | 11/1998 | Tsukahara et al. ............ 60/733 |
| 5,884,483 A | 3/1999 | Munro .......................... 60/739 |
| 5,918,457 A | 7/1999 | Döbbeling ................. 60/39.06 |
| 5,970,716 A | 10/1999 | Forrester et al. .............. 60/746 |

(List continued on next page.)

FOREIGN PATENT DOCUMENTS

| | | |
|---|---|---|
| EP | 0780638 | 6/1997 |
| EP | 1028237 | 8/2000 |
| EP | 1108951 | 6/2001 |
| JP | 3255815 | 11/1991 |
| JP | 9126414 | 5/1997 |
| JP | 9166326 | 6/1997 |
| JP | 2000329346 | 11/2000 |

OTHER PUBLICATIONS

Jennifer E. Gill, Update Options for the MS900A Heavy–Duty Gas Turbine, GE Power Systems, Schenectady, NY, GER–3928A, Date unknown.

(List continued on next page.)

Primary Examiner—Cheryl J. Tyler
Assistant Examiner—William H. Rodriguez
(74) Attorney, Agent, or Firm—Robert P. Santandrea; Patrick K. Patnode

(57) ABSTRACT

A turbine containing system is disclosed. The system includes an intake section, a compressor section downstream from the intake section, a combustor section having a primary combustion system downstream from the intake section, a secondary combustion system downstream from the primary combustion system, a turbine section, an exhaust section and a load. The secondary combustion system includes an injector for transversely injecting a secondary fuel into a stream of combustion products of the primary combustion system. The injector including a coupling, a wall defining an airfoil shape circumscribing a fuel mixture passage, and at least one exit for communication between said fuel mixture passage and said stream of primary combustion products.

75 Claims, 6 Drawing Sheets

U.S. PATENT DOCUMENTS

| | | | |
|---|---|---|---|
| 5,974,781 A | | 11/1999 | Correa et al. .............. 60/39.37 |
| 6,038,861 A | | 3/2000 | Amos et al. ................... 60/737 |
| 6,047,550 A | * | 4/2000 | Beebe .......................... 60/737 |
| 6,070,411 A | | 6/2000 | Iwai et al. ..................... 60/737 |
| 6,094,916 A | | 8/2000 | Puri et al. ..................... 60/737 |
| 6,109,038 A | | 8/2000 | Sharifi et al. ................. 60/737 |
| 6,192,688 B1 | * | 2/2001 | Beebe .......................... 60/723 |
| 6,220,034 B1 | * | 4/2001 | Mowill ......................... 60/737 |
| 6,272,863 B1 | | 8/2001 | Pfefferle et al. .............. 60/723 |
| 6,295,801 B1 | * | 10/2001 | Burrus et al. ................. 60/776 |

OTHER PUBLICATIONS

A.D. Foster et al., Fuels Flexibility in Heavy–Duty Gas Turbines, GE Company, Schenectady, NY, Date unknown.

T.E. Ekstom et al., Gas Turbines for Mechanical Drive Applications, GE Industrial & Power Systems, Schenectady, NY, GER–3701B, 1993.

Marvin M. Schorr et al., Gas Turbine NOx Emissions–Approaching Zero—Is it Worth the Price?, GE Electric Power Systems, Schenectady, NY, GER 4172, 1999.

L.B. Davis et al., Dry Low NOx Combustion Systems for GE Heavy–Duty Gas Turbines, GE Power Systems, Schenectady, NY, GER–3568G, Oct. 2000.

G.H. Badeer, GE Aeroderivative Gas Turbines—Design and Operating Features, GE Power Systems, Evendale, OH, GER–3695E, Oct. 2000.

Eric Gebhardt, The F Technology Experience Story, GE Power Systems, Atlanta, GA, GER–3950–C, Oct. 2000.

Roointon Pavri et al., Gas Turbine Emissions and Control, GE Energy Services, Atlanta, GA, GER–4211, Mar. 2001.

Blair A. Folsom et al., Combustion Modification–An Economic Alternative for Boiler NOx Control, GE Power Systems, Schenectady, NY, GER–4192, Apr. 2001.

Roberta Eldrid et al., The 7FB: The Next Evolution of the F Gas Turbine, GE Power Systems, Schenectady, NY, GER–4194, Apr. 2001.

H.E. Miller, Development of the GE Quiet Combustor and Other Design Changes to Benefit Quality, GE Company, Schenectady, NY, GER–3551, 03/88.

* cited by examiner

TURBINE CONTAINING SYSTEM AND AN INJECTOR THEREFOR

BACKGROUND OF INVENTION

This invention relates to a turbine containing system and, more specifically, to a turbine containing system that, in addition to a primary combustion system, includes a secondary combustion system including an injector for transversely injecting a secondary fuel mixture into a stream of combustion products of the primary combustion system.

There is a drive within the industry to produce new turbines that will operate at high efficiency without producing undesirable air polluting emissions. The primary air polluting emissions usually produced by turbines burning conventional hydrocarbon fuels are oxides of nitrogen, carbon monoxide and unburned hydrocarbons. It is well known in the art that oxidation of molecular nitrogen in air breathing engines is highly dependent upon the maximum temperature in the combustion system reaction zone and the residence time for the reactants at the maximum temperatures reached within the combustor. The level of thermal NOx formation is minimized by maintaining the reaction zone temperature below the level at which thermal NOx is formed or by maintaining an extremely short residence time at high temperature such that there is insufficient time for the NOx formation reactions to progress.

One method of controlling the temperature of the reaction zone below the level at which thermal NOx is formed is to premix fuel and air to a lean mixture prior to combustion. U.S. Pat. No. 4,292,801, dated October 1981, describes a dual stage-dual mode low NOx combustor based on lean premixed combustion technology for a gas turbine application. U.S. Pat. No. 5,259,184, dated November 1993, describes a dry low NOx single stage dual mode combustor construction for a gas turbine. The disclosure of each of U.S. Pat. No. 4,292,801 and U.S. Pat. No. 5,259,184 is incorporated by reference herein in its entirety. The thermal mass of the excess air present in the reaction zone of a lean premixed combustor absorbs heat and reduces the temperature rise of the products of combustion to a level where thermal NOx is not formed. Even with this technology, for the most advanced high efficiency heavy duty industrial gas turbines, the required temperature of the products of combustion at the combustor exit/first stage turbine inlet at maximum load is so high that the combustor must be operated with peak gas temperature in the reaction zone which exceeds the thermal NOx formation threshold temperature resulting in significant NOx formation even though the fuel and air are premixed lean. The problem to be solved is to obtain combustor exit temperatures high enough to operate the most advanced, high efficiency heavy duty industrial gas turbines at maximum load without forming a significant amount of thermal NOx.

Lean premixed combustion of hydrocarbon fuels in air is widely used throughout the gas turbine industry as a method of reducing air pollutant levels; in particular, thermal NOx emissions levels for gas turbine combustors. Lean direct injection (LDI) of hydrocarbon fuel and air has also been shown to be an effective method for reducing NOx emission levels for gas turbine combustion systems although not as effective as lean premixed combustion. An example of an LDI fuel injector assembly is described in an article from the 1987 Tokyo International Gas Turbine Congress entitled "Lean Primary Zones: Pressure Loss and Residence Time Influences on Combustion Performance and NOx Emissions," the disclosure of which is hereby incorporated by reference.

Thus, there remains a need for a new and improved turbine containing system and, more specifically, a turbine containing system that, in addition to a primary combustion system, includes a secondary combustion system including a new and improved injector for transversely injecting a secondary fuel mixture into a stream of combustion products of the primary combustion system.

SUMMARY OF INVENTION

The present invention is directed to a turbine containing system that includes an intake section, a compressor section downstream from the intake section, a combustor section having a primary combustion system downstream from the intake section, a secondary combustion system downstream from the primary combustion system, a turbine section; an exhaust section and a load. The secondary combustion system includes an injector for transversely injecting a secondary fuel into a stream of combustion products of the primary combustion system. The injector includes a coupling; a wall circumscribing a fuel mixture passage, which in a preferred embodiment defines an airfoil shape; and at least one exit for communication between the fuel mixture passage and the stream of primary combustion products.

The load is an electrical generator when the turbine containing system is used in power generation. Alternatively, the load may be for selected mechanical drive applications such as any one of a compressor for use in oil fields and a compressor for use in refrigeration. When used in oil fields, the application may be gas reinjection service. When used in refrigeration, the application may be in liquid natural gas (LNG) plants. Yet another load may be a propeller as may be found in turbojet engines, turbofan engines and turboprop engines.

The secondary combustor section may be provided to any location between the primary combustor and the turbine. Such location may include, for example, any one of a can of the combustor section, a transition piece of the combustor section, a turbine inlet section and an interface between a can and a transition piece of the combustor section. Also the secondary combustor section may be provided to the turbine section such as, for example, the injector being provided as a first stage airfoil of the turbine section. Preferably, the secondary combustion system is provided substantially to the entrance of the transition piece.

The secondary combustion system may include a plurality of injectors. To that end, the plurality of injectors may be spatially distributed in the stream of combustion products of the primary combustion system. The plurality of injectors may include a combination of long injectors and short injectors such as, for example, alternating long and short injectors.

In a preferred embodiment, the injector includes a fuel recirculation zone prevention means. Such a means is any structure that prevents flow separation that leads to recirculation at any location within the injector to thereby prevent the occurrence of an auto-ignition event in the injector before the fuel passing through the exits of the injector. A structure that accomplishes the function is flaring member between the coupling and the start of the exits in the injector.

In addition to the wall circumscribing a fuel mixture passage, the injector may further include an inner wall for defining a coolant passage. In a preferred embodiment, the coolant passage is adjacent to the circumscribing wall.

In addition, the injector may further include a mixer-containing element between the wall and the inner wall. This mixer-containing element may define a second coolant passage. Further, the mixer-containing element may include a communications passage between the coolant passage and the second coolant passage. Moreover, the mixer-containing element may include mixing passages for communicating a coolant to the exit. Preferably, an axis of the mixing passage is substantially perpendicular to an axis of the exit.

As to the at least one exit for communication between the fuel mixture passage and the stream of primary combustion products, its diameter is greater than the diameter of the mixing passage. A diameter of the mixing passage providing the coolant may be greater than a diameter of an entrance providing fuel to the exit. In addition, a length of the exit may be between about 1–10 diameters of an entrance providing fuel to the exit. Preferably, the length of the exit may be between about 3–7 diameters of the entrance providing fuel to the exit. As to the exit itself, its diameter may be about 5 times the diameter of the entrance providing fuel to the exit.

In addition, the wall may further include holes for creating a cooling film on an outer surface of the injector. In a preferred embodiment, the holes are located down stream from the exits in the injector, more preferably, between about ½ to ⅔ the distance from the exits the trailing edge.

The wall circumscribing a fuel mixture passage defines an area at each cross-section. In a preferred embodiment, the cross-sectional area decreases as the distance from the coupling increases. One way for accomplishing the cross-sectional area decrease may be for the wall to be tapered as the distance from the coupling increases. Another way for accomplishing the cross-sectional area decrease may be to further include an area-decreasing member within a wall that is substantially not tapered. Yet another way may be a combination of a tapered wall surrounding an area-decreasing member within the tapered wall.

As to the exit for communication between the fuel mixture passage and the stream of the primary combustion products, there may be a plurality of exits. In such a case, the plurality of exits may be configured so as to provide a fuel mass proportional to the oxidants (e.g., oxidizing gases) in a region of the injector location. One way for providing a fuel mass proportional to the oxidants (e.g., oxidizing gases) in a region of the injector location may be through a pre-selected spacing of the plurality of exits. Another way may be through a pre-selected distribution of exit diameters of the plurality of exits. Yet another way may be a pre-selected exit spacing in combination with a pre-selected exit diameter distribution.

As to an airfoil shaped injector, it may be defined by an inscribed circle diameter of a leading edge and a length from the leading edge to a trailing edge. The ratio of the inscribed circle diameter (d) of the leading edge to the length (l) from the leading edge to a trailing edge may be taken as an aspect ratio (d/l). In a preferred embodiment, the aspect ratio (d/l) may be between about 1 and 12, more preferably, the aspect ratio (d/l) may be between about 1 and 2, and, even more preferably, the aspect ratio (d/l) may be about 1.4. Also, it will be appreciated by those skilled in the art that an airfoil shape injector may further include a turning angle. Such turning angle may contribute to the mixing of the fuel injected into the primary combustion products to help facilitate the lower NOx emissions of the invention. It will be appreciates that the turning angle may be variable. For example, as one moves from the coupling of the injector toward the exit furthest from the coupling the turning angle of each cross-section may be tailored to that appropriate for the injector to create the help facilitate the lower NOx emissions of the invention.

Accordingly, one aspect of the present invention is to provide a turbine containing system that includes an intake section, a compressor section downstream from the intake section, a combustor section having a primary combustion system downstream from the intake section, a secondary combustion system downstream from the primary combustion system, a turbine section; and an exhaust section. The secondary combustion system includes an injector for transversely injecting a secondary fuel mixture into a stream of combustion products of the primary combustion system. The injector includes a coupling, a wall circumscribing a fuel mixture passage, and at least one exit for communicating between the fuel mixture passage and the stream of primary combustion products.

Another aspect of the present invention is to provide an injector for use in a turbine containing system. The system includes an intake section, a compressor section downstream from the intake section, a combustor section having a primary combustion system, a secondary combustion system downstream from the primary combustion system for further combusting a stream of primary combustion products, a turbine section, and an exhaust section. The injector includes a coupling; a wall defining an airfoil shape circumscribing a fuel mixture passage; and at least one exit for communication between the fuel mixture passage and the stream of primary combustion products.

Still another aspect of the present invention is to provide a turbine containing system that includes an intake section, a compressor section downstream from the intake section, a combustor section having a primary combustion system downstream from the intake section, a secondary combustion system downstream from the primary combustion system, a turbine section; an exhaust section and a load. The secondary combustion system includes an injector for transversely injecting a secondary fuel into a stream of combustion products of the primary combustion system. The injector includes a coupling; a wall defining an airfoil shape circumscribing a fuel mixture passage; and at least one exit for communication between the fuel mixture passage and the stream of primary combustion products.

These and other aspects of the present invention will become apparent to those skilled in the art after a reading of the following description of the preferred embodiment when considered with the drawings.

DETAILED DESCRIPTION

Figure 1:
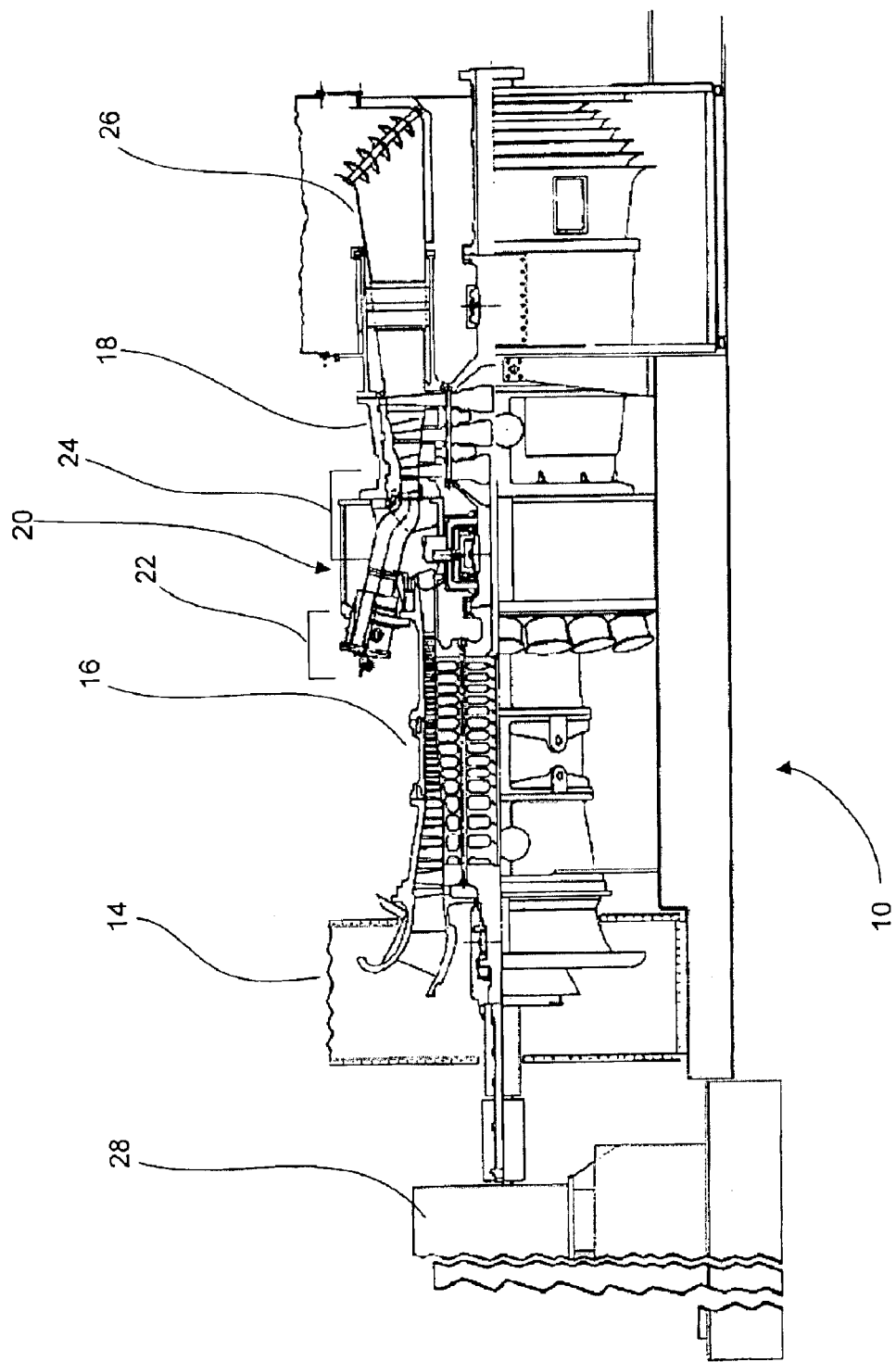
FIG. 1 is a partial cross-sectional side view of a turbine containing system according to an embodiment of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to drawings in general and FIG. 1 in particular, it will be understood that the illustrations are for the purpose of describing a preferred embodiment of the invention and are not intended to limit the invention thereto. As best seen in FIG. 1, a turbine containing system, indicated generally by the numeral 10, is shown constructed according to the present invention. The turbine containing system, which, in addition to a primary combustion system, includes a secondary combustion system 24 including an injector 12 (not shown) for transversely injecting a secondary fuel mixture into a stream of combustion products of the primary combustion system.

Figure 2:
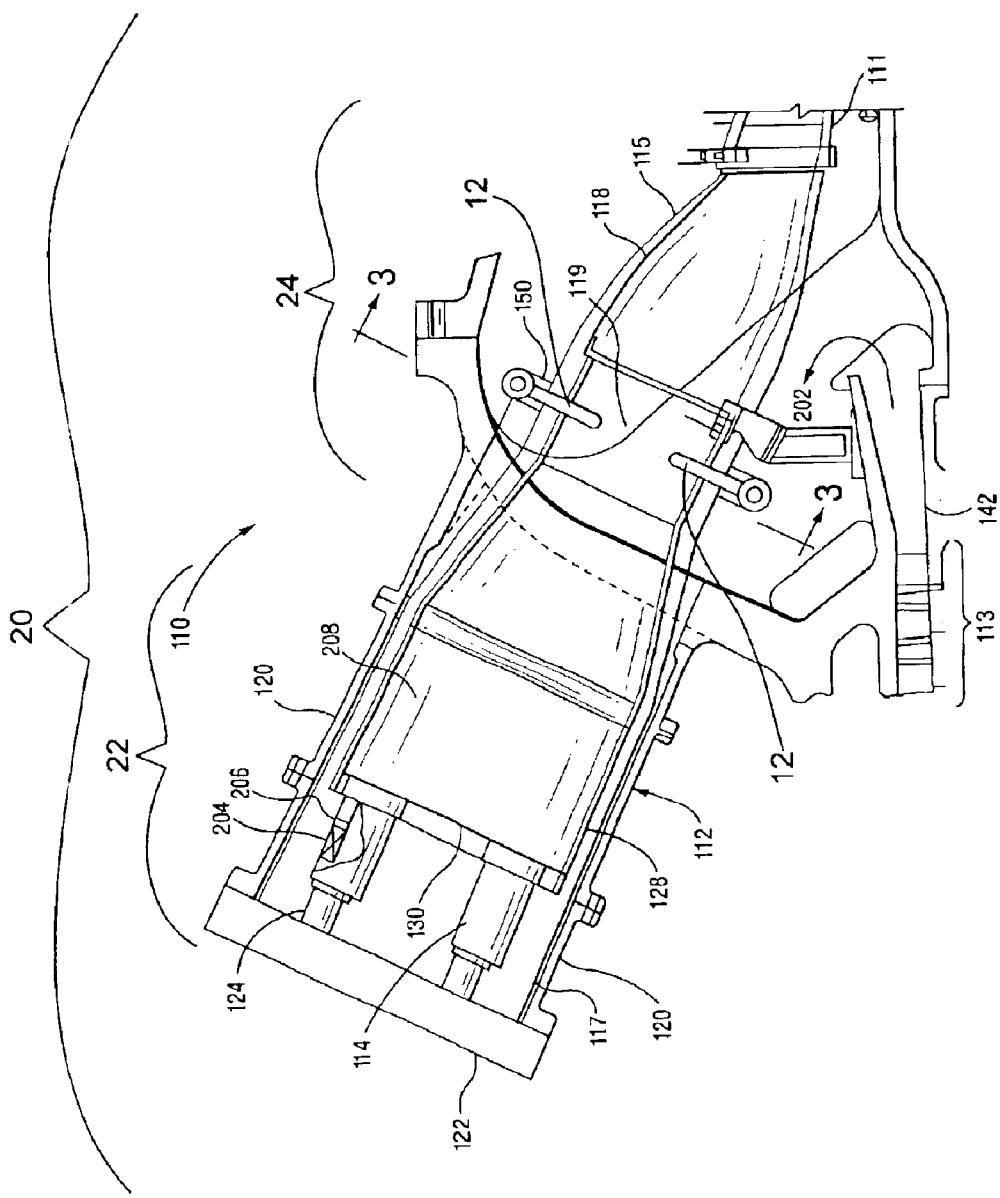
FIG. 2 is a cross-sectional side view of a combustor for a combustor section useable in the turbine containing system of FIG. 1.
Figure 3:
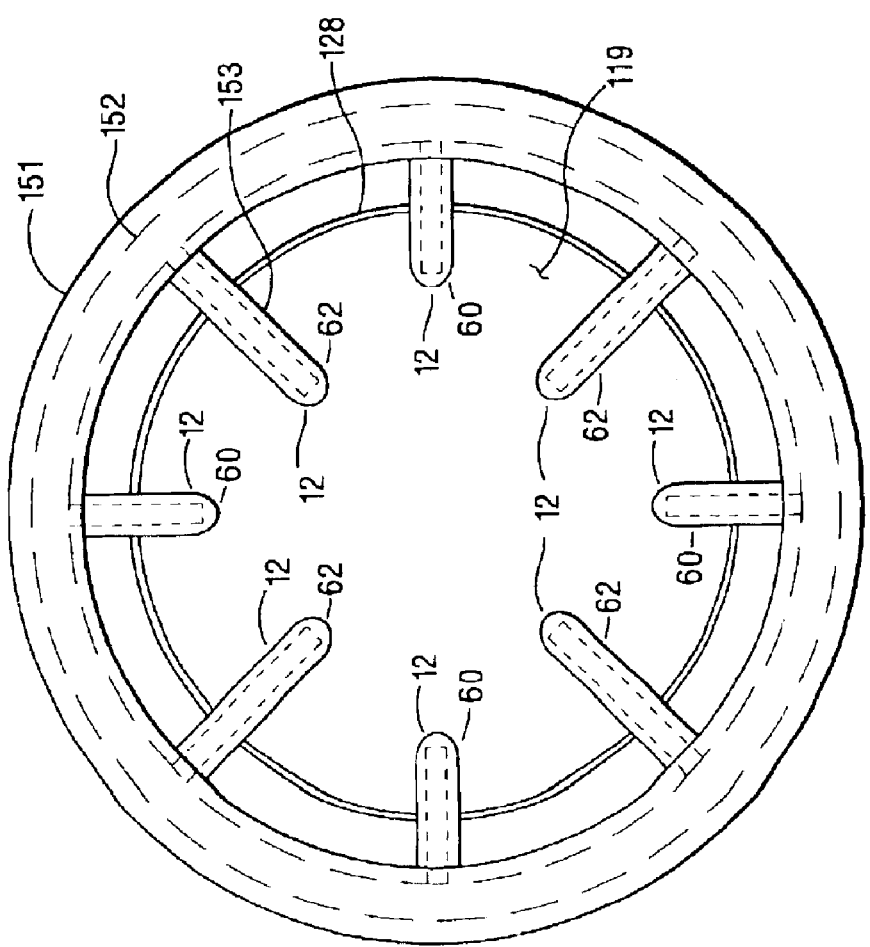
FIG. 3 is an axial view of a secondary combustion system useable in the turbine combustor section of FIG. 2 and the turbine containing system of FIG. 1.

In FIG. 1, the turbine containing system 10 includes an intake section 14, a compressor section 16 downstream from the intake section 14, a combustor section 20 having a primary combustion system 22 downstream from the intake section 16, a secondary combustion system 24 downstream from the primary combustion system 22, a turbine section, 18 and an exhaust section 26. As best seen in FIGS. 2 and 3, the secondary combustion system 24 includes an injector 12 for transversely injecting a secondary fuel mixture into a stream of combustion products of the primary combustion system 22. As best seen in FIGS. 4, 5, 7, 8 and 9, the injector 12 includes a coupling 30, a wall 32 circumscribing a fuel mixture passage 36, and at least one exit 34 for communicating between the fuel mixture passage 36 and the stream of primary combustion products.

Referring again to FIG. 1, the turbine containing system 10 includes a compressor section 16, a combustor section 20, and a turbine section 18. The turbine section 18 through a common shaft connection drives the compressor section 16 and the load 28. The load 28 may be any one of an electrical generator and a mechanical drive application. Examples of such mechanical drive applications include any one of a compressor for use in oil fields and a compressor for use in refrigeration. When used in oil fields, the application may be gas reinjection service. When used in refrigeration, the application may be in liquid natural gas (LNG) plants. Yet another load 28 may be a propeller as may be found in turbojet engines, turbofan engines and turboprop engines.

Referring again to FIGS. 1 and 2, the combustor section 20 may include a circular array of a plurality of circumferentially spaced combustors 110. A fuel/air mixture is burned in each combustor 110 to produce the hot energetic flow of gas, which flows through a transition piece 118 for flowing the gas to the turbine nozzles 111 of the turbine section 18.

A conventional combustor is described in the above-noted U.S. Pat. No. 5,259,184. For purposes of the present description, only one combustor 110 is illustrated, it being appreciated that all of the other combustors 110 arranged about the combustor section 20 are substantially identical to the illustrated combustor 110.

Although FIG. 1 shows a plurality of circumferentially spaced combustors 110 and FIG. 2 shows a cross section of a combustor 110 that have come to be know in the art as can combustor systems, it is contemplated that the present invention may be used in conjunction with other combustor systems including and not limited to annular combustor systems.

Referring now to FIG. 2, there is shown generally a combustor 110 for a turbine containing system 10 including primary combustion system 22, a secondary combustion system 24 including an assembly 150 (as described in U.S. Pat. No. 6,047,550 and U.S. Pat. No. 6,192,688, the disclosure of each being incorporated by reference herein in its entirety) for communication with an injector 12, and a transition piece 118 for flowing hot gases of combustion to the turbine nozzles 111 and the turbine blades (not shown). The primary combustion system 22 includes a casing 120, an end cover 122, a plurality of start-up fuel nozzles 124, a plurality of premixing fuel nozzles 114, a cap assembly 130, a flow sleeve 117, and a combustion liner 128 within the sleeve 117. A suitable cap assembly 130 is described in U.S. Pat. No. 5,274,991, the disclosure of which is hereby incorporated by reference. An ignition device (not shown) is provided and preferably comprises an electrically energized spark plug. Combustion in the primary combustion system 22 occurs within the combustion liner 128. Combustion air is directed within the combustion liner 128 via the flow sleeve 117 and enters the combustion liner 128 through a plurality of openings formed in the cap assembly 130. The air enters the combustion liner 128 under a pressure differential across the cap assembly 130 and mixes with fuel from the start-up fuel nozzles 124 and/or the premixing fuel nozzles 114 within the combustion liner 128. Consequently, a combustion reaction occurs within the combustion liner 128 releasing heat for the purpose of driving the turbine section 18. High-pressure air for the primary combustion system 22 enters the flow sleeve 117 and a transition piece impingement sleeve 115, from an annular plenum 202. Compressor section 16, which is represented by a series of vanes and blades at 113 and a diffuser 142, supplies this high-pressure air. Each premixing fuel nozzle 114 includes a swirler 204, consisting of a plurality of swirl vanes that impart rotation to the entering air and a plurality of fuel spokes 206 that distribute fuel in the rotating air stream. The fuel and air then mix in an annular passage within the premix fuel nozzle 114 before reacting within the primary reaction zone 208.

The secondary combustion system 24 includes the assembly 150 for communication with an injector 12 that is provided for operating at high inlet temperature conditions. Referring to FIGS. 2 and 3, the assembly 150 may include an diluent manifold 151, a fuel mixture manifold 152, and a plurality of injectors 12 that penetrate the combustion liner 128 and introduce additional fuel mixture and diluent into the secondary reaction zone 119 within the combustor assembly 110. The hot products of combustion exiting the primary reaction zone 208 ignite this secondary fuel mixture. The resulting secondary hydrocarbon fuel oxidation reactions go to substantial completion in the transition piece 118. The secondary fuel mixture may be injected into the secondary reaction zone 119 via a plurality of exits 34 in each injector 12. It is preferred that the fuel mixture is well mixed prior to being introduced into the secondary reaction zone and, more preferably, prior to being introduced into the fuel mixture manifold 152.

As depicted in FIG. 3, the secondary combustion system 24 may include a plurality of injectors 12 that may be spatially distributed in the stream of combustion products of the primary combustion system 22. The plurality of injectors 12 may include a combination of long injectors 62 and short injectors 60 such as, for example, alternating long and short injectors.

Figure 4:
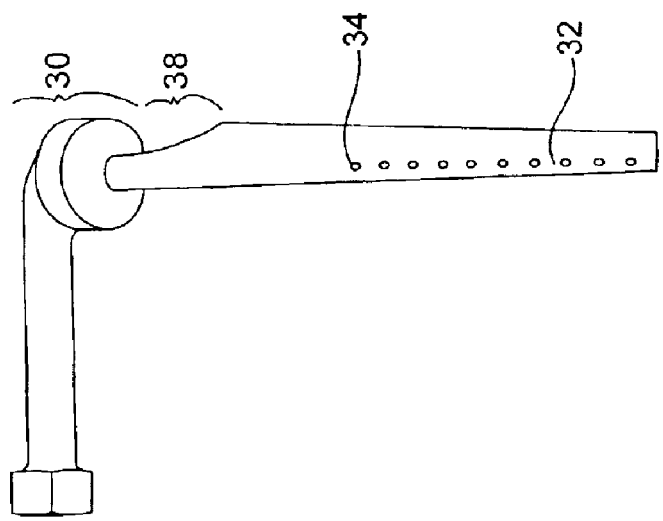
FIG. 4 is an injector usable in the secondary combustion system of FIGS. 1, 2 and 3.
Figure 5:
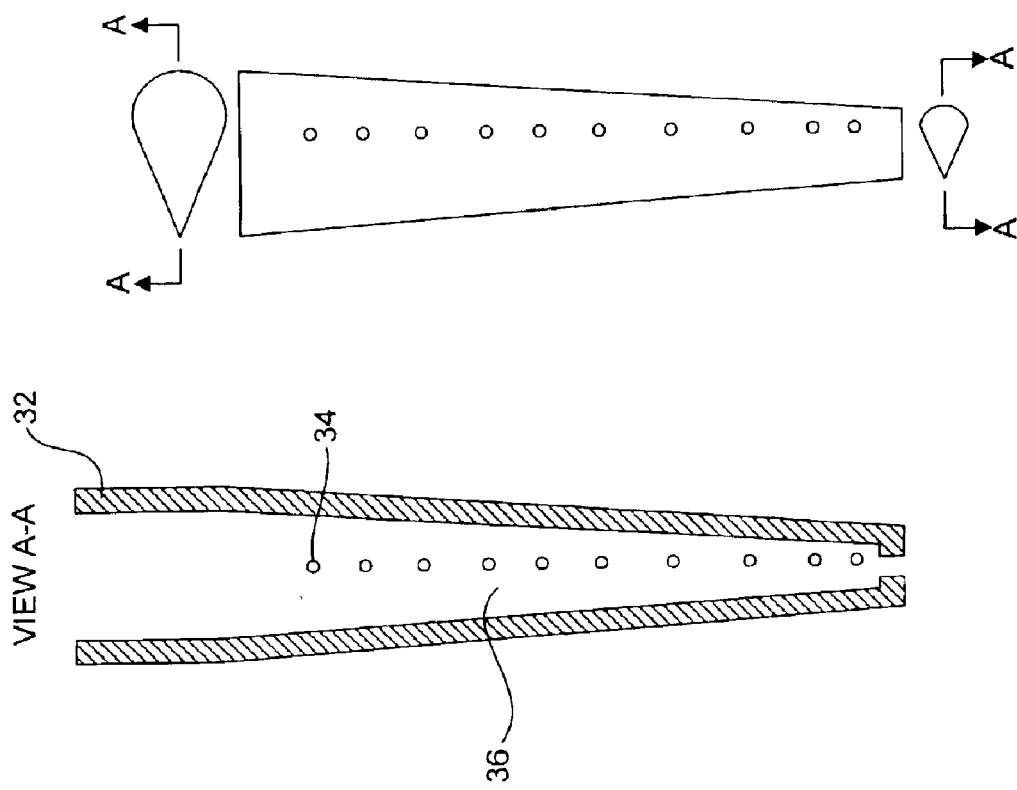
FIG. 5 a cross-sectional side-view of the injector of FIG. 4.

As depicted in FIGS. 4 & 5, each injector 12 may include a recirculation prevention means 38 for the fuel mixture. Such a means 38 is any structure that that prevents flow separation that leads to recirculation of a fuel mixture at any location within the injector to thereby prevent the occurrence of an auto-ignition event in the injector 12 before the fuel mixture passes through the exits 34 of the injector 12. A structure that accomplishes this function is flaring member between the coupling 30 and the start of the exits 34 in the injector 12 as specifically depicted in FIG. 4. Each injector 12 includes a coupling 30, a wall 32 circumscribing a fuel mixture passage 36 and at least one exit 34 for communication between the fuel mixture passage 36 and the secondary reaction zone 119 including the stream of primary combustion products. In a preferred embodiment, wall 32 circumscribing a fuel mixture passage 36 defines an airfoil shape.

FIG. 5 is a cross-sectional side view of the injector of FIG. 4 showing the injector wall 32 circumscribing the fuel mixture passage 36 and including exits 34 for communication between the fuel mixture passage 36 and a stream of primary combustion products in the combustor. The exits 34 are spaced such that the mass of fuel mixture and diluent mixture introduced into the secondary reaction zone 119 including the stream of primary combustion products is proportional to the oxidants (e.g., oxidizing gasses) in the secondary reaction zone 119. In an angular implementation such as in the injector shown in FIG. 3, the spacing of the exits 34 may be increased as the distance from the coupling is increased, when, for example, the diameter, $d_{34}$, of the exit 34 is maintained substantially constant.

Figure 9:
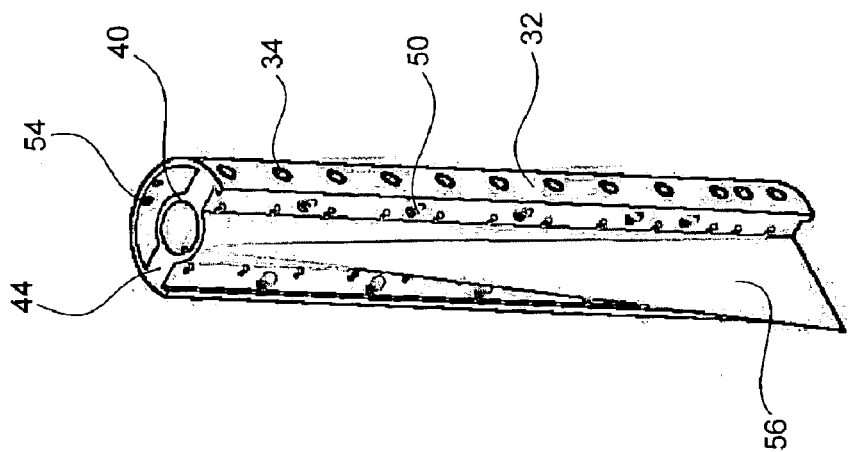
FIG. 9 is a partial isometric cutaway drawing of the injector of FIGS. 7 and 8.
Figure 8:
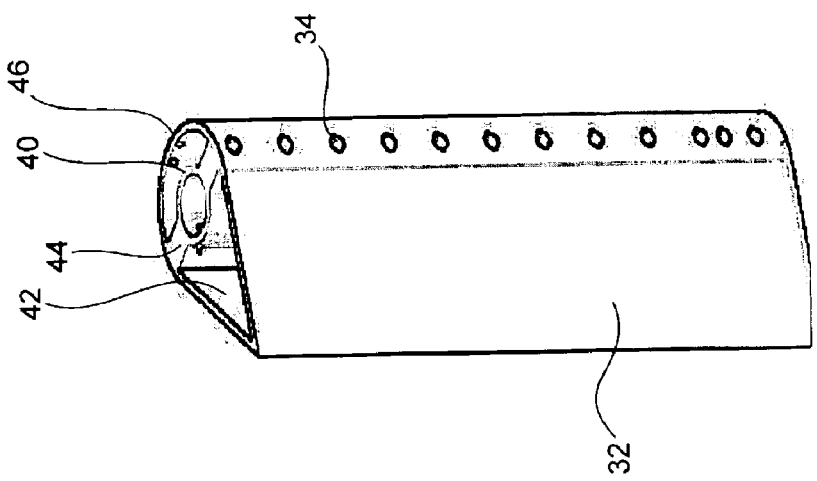
FIG. 8 is a partial isometric drawing of the injector of FIG. 7.
Figure 7:
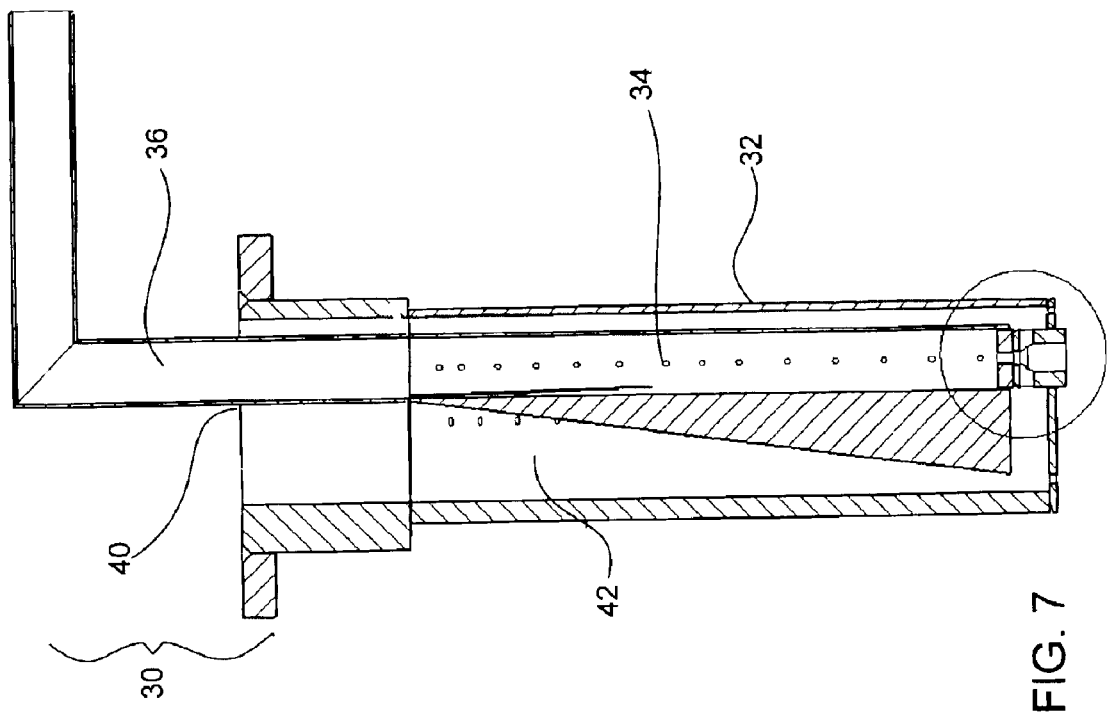
FIG. 7 is a sectional view of an alternative injector usable in the secondary combustion system of FIGS. 1, 2 and 3.

As depicted in FIGS. 7, 8, and 9, each injector 12, in addition to the wall circumscribing 32 the fuel mixture passage 36, may further include an inner wall 40 for defining a coolant passage 42. In addition, the injector may further include a mixer-containing element 44 between the wall 32 and the inner wall 40. This mixer-containing element 44 may define a second coolant passage 46. Further, the mixer-containing element 44 may include a communications passage 50 between the coolant passage 42 and the second coolant passage 46. There may be a plurality of communications passages 50 between the coolant passage 42 and the second coolant passage 46. The communications passage(s) 50 distributes diluent between the coolant passage 42 and the second coolant passage 46 to balance the supply of diluent with the injector 12. Also, the mixer-containing element 44 may include mixing passages 52 for communicating a coolant to the exit 34. Preferably, an axis of the mixing passage 52 is substantially perpendicular to an axis of the exit 34.

In the operation of an injector 12, the fuel mixture provided through the fuel mixture passage 36 may be substantial only a fuel mixture. Alternatively, the fuel mixture may be combined with a diluent. For example, an injector 12 as depicted in FIGS. 4 & 5 is operated using a fuel mixture that cools the circumscribing wall 32 in a manner that lowers its heating value while preventing any premature auto-ignition of the fuel mixture as it passes through fuel mixture passage 36 to the exits 34. In contrast, an injector 12 as depicted in FIGS. 7, 8, 9, & 10 may be operated using a fuel mixture that ranges from being substantially only a fuel to a mixture that is a fuel premixed with air and/or a diluent. One reason for this flexibility in the injector 12 as depicted in FIGS. 7, 8, 9, & 10 is the inclusion of the inner wall 40 for defining the coolant passage 42 and, optionally the second coolant passage 46. This combination of fuel mixture passage 36 surrounded by coolant passages 42 & 46 permits providing substantially only a fuel mixture to fuel mixture passage 36 while at the same time avoiding an auto-ignition of the fuel mixture.

Figure 10:
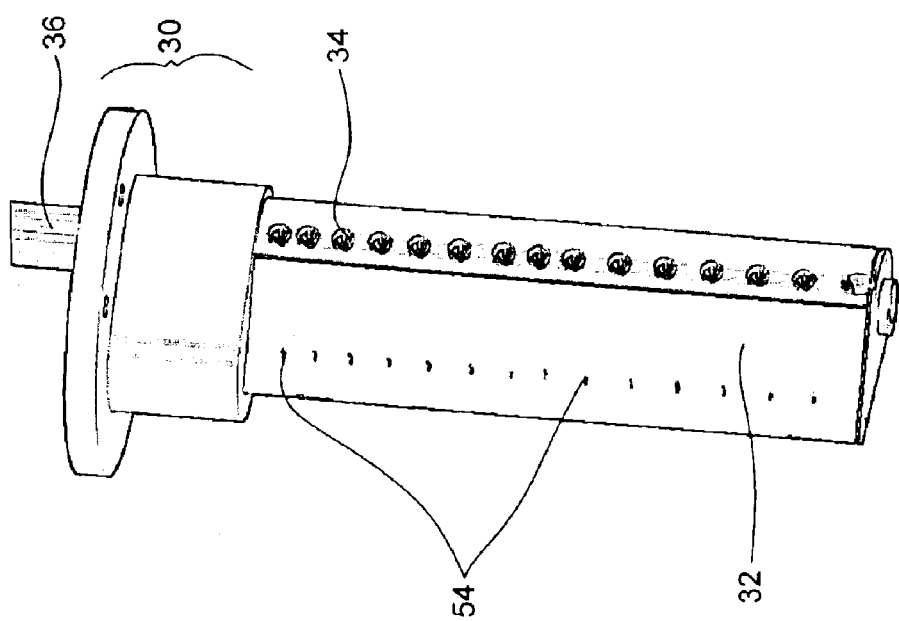
FIG. 10 is a isometric view of yet another alternative injector usable in the secondary combustion system of FIGS. 1, 2 and 3.

FIG. 10 is an isometric view of an alternative the injector 12. As depicted in FIGS. 8 and 9, the injector 12, in addition to the wall circumscribing 32 the fuel mixture passage 36, may further include an inner wall 40 for defining a coolant passage 42. Also, the injector may further include a mixer-containing element 44 between the wall 32 and the inner wall 40. This mixer-containing element 44 may define a second coolant passage 46. Further, the mixer-containing element 44 may include a communications passage 50 between the coolant passage 42 and the second coolant passage 46. In addition, the mixer-containing element 44 may include mixing passages 52 for communicating a coolant to the exit 34.

In contrast to the injector 12 of FIG. 7, the exit 34 farthest form the coupling of the injector 12 of FIG. 10 is directed at an angle of about 45 degrees relative to the longitudinal axis of the injector 12. In this manner, the entire area round the injector 12 is supplied with fuel mixture. In addition, rather than the holes 54 being in the wall 32 at the leading edge of the injector 12, the holes 54 in FIG. 10 are in the wall 32 of the injector down stream from the exits 34. Preferably, the holes 54 are in the wall 32 at a distance between about ½ to ⅔ the distance from the exits 34 the trailing edge.

Figure 11:
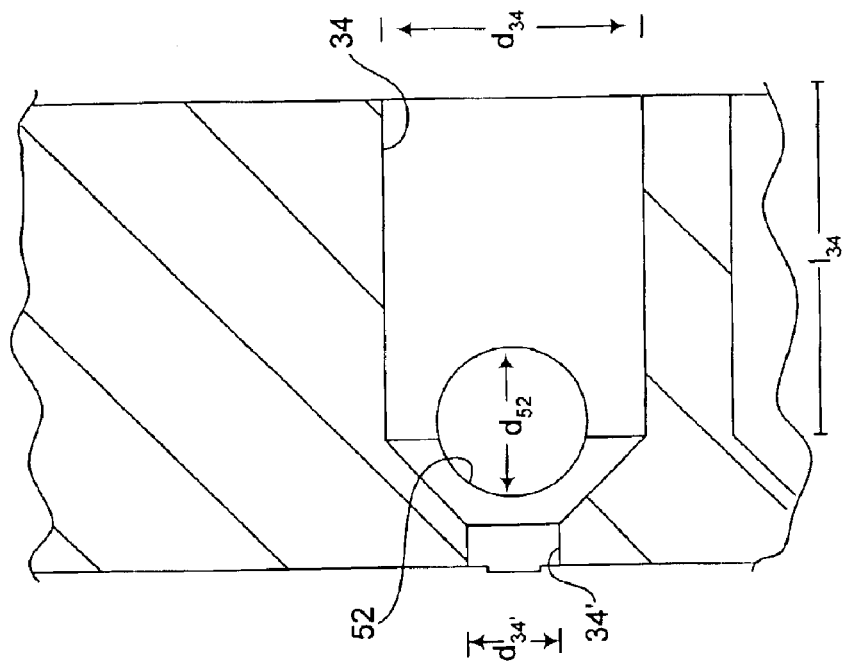
FIG. 11 is cross-sectional view of an exit for the injector of FIGS. 7, 8 and 9.

As depicted in FIG. 11, the entrance 34' is the location for the initiation of the communication between the fuel mixture passage 36 through exit 34 with the secondary reaction zone 119 that includes the stream of primary combustion products. Along the path from entrance 34' to exit 34 there are mixing passages 52 (only one is depicted in the cross-section of FIG. 11 as the second is excluded by the cross-section) providing the coolant to the fuel mixture. Exist 34 has an exit diameter, $d_{34}$ and mixing passage 52 has a diameter, $d_{52}$. Exit diameter, $d_{34}$ has a greater than the diameter, $d_{52}$. Entrance 34' has a diameter, $d_{34}$. The diameter, $d_{52}$, of the mixing passage 52 providing the coolant may be greater than an entrance diameter, $d_{34}'$, of an entrance 34'. In addition, a length, 134, which is the length from the entrance 34' to the exit 34, may be between about 1 to 10 times the diameter, $d_{34}'$, of the entrance 34'. Preferably, the length, $l_{34}'$, may be between about 3 to 7 times the diameter, $d_{34}'$, of the entrance 34'. As to the exit 34 itself, its diameter, $d_{34}$, may be about 5 times the diameter, $d_{34}'$, of the entrance 34'.

As depicted in FIGS. 7, 8, and 9, the coolant passages 42 & 46 are adjacent to the wall 32. In addition, the wall 32 may further include holes 54 for creating a cooling film on an outer surface of the injector 12. In FIGS. 8 and 9, the holes 54 are located at the leading edge of the injector 12. In contrast, in FIG. 10, the holes 54 are located at the trailing edge of the injector 12. It will be appreciated by those skilled in the art that the holes 54 may be in any location of surface of the injector 12 that creates the cooling effect of the outer surface of the injector 12. In a preferred embodiment, the holes 54 are located down stream from the exits 34 in the injector 12. Preferably, holes 54 are in the wall 32 at a distance between about ½ to ⅔ the distance from the exits 34 the trailing edge.

Figure 6A:
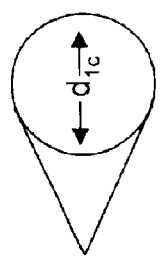
FIG. 6a is cross-sectional view of an airfoil profile usable with the injector of FIGS. 4 and 5.
Figure 6B:
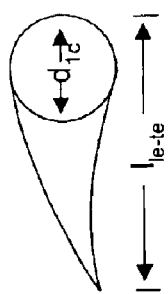
FIG. 6b is another cross-sectional view of an airfoil profile usable with the injector of FIGS. 4 and 5.
Figure 6C:
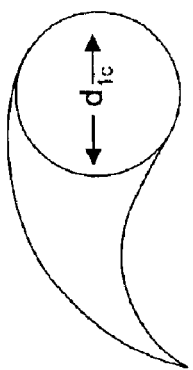
FIG. 6c is yet another cross-sectional view of an airfoil profile usable with the injector of FIGS. 4 and 5.

As depicted in FIGS. 6a, 6b, and 6c, cross-sectional views of an airfoil profile may have any of a variety of profiles that may be used with any of the injectors 12 as depicted in FIGS. 4, 5, 7, 8, & 9. Each injector 12 may include the profile to, for example, create a pre-swirl for the turbine, if desired, and may further include turning angles as shown in FIGS. 6b and 6c. The use of injectors 12 having a profile for creating pre-swirls would be particularly beneficial for use in combination with annular combustor systems. When used with annular combustor systems, injectors are preferably of the same length. An aspect ratio of an inscribed circular diameter, $d_{ic}$, of the leading edge of the cross-section of the airfoil profiles and a length from the leading edge to the trailing edge, $l_{le-te}$, is between about 1 and 12. Preferably the aspect ratio is between about 1 and 2 and most preferably, about 1.4.

In operation, the turbine containing system by the primary combustion system and the secondary combustion system is capable of reducing $NO_x$ emission levels. These reduced levels are enhanced because of injectors 12 for transversely injecting a secondary fuel mixture into a stream of combustion products of the primary combustion system. As a result thereof, the turbine containing system 10 may drive the load 28 in an environmentally friendlier manner. Thus, any one of an electrical generation and a mechanical drive application such as, for example, a compressor for use in oil fields, a compressor for use in refrigeration and a propeller as may be found in turbojet engines, turbofan engines and turboprop engines, may be operated in a more sustainable manner.

During the operation of turbine containing system 10 (referring to FIG. 1), air is drawn into intake section 14 for compression by compressor section 16 downstream. A portion of the compressed air is delivered to the primary combustion system 22 of combustor section 20 for combination and combustion with fuel mixture in a primary reaction zone 108 of each of the plurality of combustors 110. As the formation of $NO_x$ is temperature and time dependant, the combustion temperature and time are controlled to, if not prevent, at least minimize $NO_x$ formation. Thus, the primary combustion products include uncombusted fuel and air.

As the primary combustion products move down stream to the secondary combustion system 24 (referring to FIG. 2) additional fuel air and diluent are introduced through injectors 12 in proportions that permit substantially complete combustion. As in the primary combustion section 22, the combustion temperature and time are controlled to, if not prevent, at least minimize $NO_x$ formation. This may be achieved by controlling a variety of aspects of the secondary combustion system 24 including the placement of the injectors 12 relative to the primary combustion system 22. For example, the injectors 12 may be provided to any one of a can flow sleeve 117 of the combustor 110, a transition piece 118 of a combustor 110, and an interface between a can flow sleeve 117 and a transition piece 118 of the combustor 110. Also, the injectors 12 may be provided to the turbine section 18 such as, for example, a first stage airfoil 111 of the turbine section 18. Preferably, the injectors 12 of the secondary combustion system are provided substantially to the entrance of the transition piece 118.

Another manner of achieving the control of the combustion temperature and time to, if not prevent, at least minimize $NO_x$ formation in the secondary combustion system 24 (referring to FIG. 3) may be to spatially distribute the plurality of injectors 12 in the stream of combustion products of the primary combustion system 22. By including a combination of long injectors 62 and short injectors 60 such as, for example, alternating long and short injectors any blockage of mass flow may be reduced while at the same time complete mixing of primary combustion products and additional fuel mixture may be achieved.

There may be yet another manner of achieving combustion temperature control and control of time at the controlled combustion temperature. The function of controlling both temperature and time is to, if not prevent, at least minimize $NO_x$ formation in the secondary combustion system 24 (referring to FIG. 3). This yet another manner may be through the spacing of the exits 34 such that the mass of fuel mixture and diluent mixture introduced into the primary combustion products in the secondary reaction zone 119 is proportional to the oxidants (e.g., oxidizing gasses) therein. An implementation of this proportionality concept in the injector shown in FIG. 3, involves spacing the exits 34 in varied manner. That is, the spacing of the exits 34 may either increase or decrease, as the distance from the coupling 30 is increased, when, for example, the diameter, $d_{34}$, of the exit 34 is maintained substantially constant. Alternatively, the spacing of the exits 34 may be maintained substantially constant and the diameter, $d_{34}$, of the exits 34 may be varied as, for example, a distribution of diameters.

The hot products of combustion exiting the secondary combustion system 24 enter the turbine section 18. The turbine section 18 through a common shaft connection drives the compressor section 16 and the load 28. It will be appreciated by those skilled in the art that the turbine section 18 may include a plurality of turbines such as, for example, a high-pressure turbine and low-pressure turbine or a high-pressure turbine, medium-pressure turbine and low-pressure turbine. Likewise, the compressor section 16 may include a plurality of compressors such as, for example, a low-pressure compressor and high-pressure compressor or a low-pressure compressor, a medium-pressure compressor and high-pressure compressor. The hot combustion products upon exiting the turbine section 18 enter the exhaust section 26.

As depicted in FIGS. 4 & 5, each injector 12 may include a fuel mixture recirculation prevention means 38. Such a means 38 is any structure that reduces residence time of a fuel mixture at any location within the injector to thereby prevent the occurrence of an auto-ignition event in the injector prior to the fuel mixture passing through the exits 34 of the injector 12. A structure that accomplishes the function is flaring member between the coupling 30 and the start of the exits 34 in the injector 12 as specifically depicted in FIG. 4.

In the operation of injectors 12 as depicted in FIGS. 7, 8, and 9, the fuel mixture passage 36 of each injector 12 included within inner wall 40 permits compressor discharge air from annular plenum 202 to be flowed through the coolant passage 42 to maintain the temperature of circumscribing wall 32 below the operating temperature of the alloy from which it is formed. When an injector 12 further includes a mixer-containing element 44 between the wall 32 and the inner wall 40, compressor discharge air from annular plenum 202 also may be flowed through a second coolant passage 46 for similar reasons. Further, the mixer-containing element 44 may include a communications passage 50 between the coolant passage 42 and the second coolant passage 46 to permit replenishment of diluent from one passage to the other. The air may further be combined with the fuel mixture by way of mixing passages 52 in communication with an exit 34 to provide a means for formulating the fuel mixture to a more appropriate composition.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A turbine containing system comprising:
   (a) an intake section;
   (b) a compressor section downstream from the intake section;
   (c) a combustor section having a primary combustion system downstream from the intake section;
   (d) a secondary combustion system downstream from the primary combustion system, said secondary combustion system including an injector for transversely injecting a secondary fuel mixture into a stream of combustion products of the primary combustion system, said injector including:
      (i) a coupling,
      (ii) a wall circumscribing a fuel mixture passage, wherein an area defined by the wall decreases as a distance from the coupling increases, and
      (iii) at least one exit for communicating between said fuel mixture passage and said stream of primary combustion products;
   (e) a turbine section; and
   (f) an exhaust section.

2. The turbine containing system according to claim 1, further including a load.

3. The turbine containing system according to claim 2, wherein the load is an electrical generator.

4. The turbine containing system according to claim 2, wherein the load is any one of a compressor and a propeller.

5. The turbine containing system according to claim 1, wherein the secondary combustor section is provided to any one of a can of the combustor section, a transition piece of the combustor section, a turbine inlet section and an interface between a can and a transition piece of the combustor scion.

6. The turbine containing system according to claim 5, wherein the secondary combustion system is provided substantially to the entrance of the transition piece.

7. The turbine containing system according to claim 1, wherein the injector is provided as a first stage airfoil of the turbine section.

8. The turbine containing system according to claim 1, wherein the secondary combustion system includes a plurality of injectors.

9. The turbine containing system according to claim 8, wherein the plurality of injectors are spatially distributed in the stream of combustion products of the primary combustion system.

10. The turbine containing system according to claim 9, wherein the plurality of injectors include a combination of long injectors and short injectors.

11. The turbine containing system according to claim 10, wherein the long and short injectors are alternating.

12. An injector for use in a turbine containing system including an intake section, a compressor section downstream from the intake section, a combustor section having a primary combustion system, a secondary combustion system downstream from the primary combustion system for further combusting a stream of primary combustion products, a turbine section, and an exhaust section, said injector including:
   (a) a coupling;
   (b) a wall defining an airfoil shape circumscribing a fuel mixture passage, wherein an area defined by the wall decreases as a distance from the coupling increases; and
   (c) at least one exit for communication between said fuel mixture passage and said stream of primary combustion products.

13. The injector according to claim 12, further including a fuel circulation prevention means.

14. The injector according to claim 12, further including an inner wall for defining a coolant passage.

15. The injector according to claim 14, further including a mixer-containing element between said wall and said inner wall.

16. The injector according to claim 15, wherein said mixer-containing element between the wall and inner wall defines a second coolant passage.

17. The injector according to claim 16, further including a communications passage in the mixer-containing element between said coolant passage and said second coolant passage.

18. The injector according to claim 15, further including mixing passages for communicating a coolant to said exit.

19. The injector according to claim 18, wherein an axis of the mixing passage is substantially perpendicular to an axis of the exit.

20. The injector according to claim 19, wherein a diameter of the exit is greater than the diameter of the mixing passage.

21. The injector according to claim 19, wherein a diameter of the mixing passage providing the coolant is greater than a diameter of an entrance providing fuel to the exit.

22. The injector according to claim 19, wherein a length of the exit is between about 1–10 diameters of an entrance providing fuel to the exit.

23. The injector according to claim 22, wherein the length is between about 3–7 diameters of the entrance providing fuel to the exit.

24. The injector according to claim 23, wherein the exit is about 5 diameters of the entrance providing fuel to the exit.

25. The injector according to claim 14, wherein the coolant passage is adjacent to the wall.

26. The injector according to claim 14, further including holes for creating a cooling film on an outer surface of said injector.

27. The injector according to claim 12, when the wall tapers.

28. The injector according to claim 12, further including an area-decreasing member.

29. The injector according to claim 12, wherein there is a plurality of exits for communication between the fuel mixture passage and the stream of the primary combustion products.

30. The injector according to claim 29, wherein the plurality of exits are configured so as to provide a fuel mass proportional to the oxidants in a region of the injector location.

31. The injector according to claim 30, wherein the plurality of exits set at a pre-selected exit spacing.

32. The injector according to claim 30, wherein the plurality of exits are set at a pre-selected distribution of exit diameters.

33. The injector according to claim 30, wherein the plurality of exits are set at a pre-selected exit spacing and a pre-selected exit diameter distribution.

34. The injector according to claim 12, further including a turning angle.

35. The injector according to claim 12, wherein an inscribed circle diameter of a leading edge and a length from the leading edge to a trailing edge has an aspect ratio (d/l) between about 1 and 12.

36. The injector according to claim 35, wherein the aspect ratio (d/l) is between about 1 and 2.

37. The injector according to claim 36, wherein the aspect ratio (d/l) is about 1.4.

38. A turbine containing system comprising:
(a) an intake section;
(b) a compressor section downstream from the intake section;
(c) a combustor section having a primary combustion system downstream from the intake section;
(d) a secondary combustion system downstream from the primary combustion system, said secondary combustion system including an injector for transversely injecting a secondary fuel into a stream of combustion products of the primary combustion system, the injector including;
  (i) a coupling,
  (ii) a wall defining an airfoil shape circumscribing a fuel mixture passage, wherein an area defined by the wall decreases as a distance from the coupling increases, and
  (iii) an exit for communicating between said fuel mixture passage and said stream of primary combustion products;
(e) a turbine section;
(f) an exhaust section; and
(g) a load.

39. The turbine containing system according to claim 38, wherein the load is an electrical generator.

40. The turbine containing system according to claim 38, wherein the load is any one of a compressor and a propeller.

41. The turbine containing system according to claim 38, wherein the secondary combustor section is provided to any one of a can of the combustor section, a transition piece of the combustor section, a turbine inlet section and an interface between a can and a transition piece of the combustor section.

42. The turbine containing system according to claim 41, wherein the secondary combustion system is provided substantially to the entrance of the transition piece.

43. The turbine containing system according to claim 38, wherein the injector is provided as a first stage airfoil of the turbine section.

44. The turbine containing system according to claim 38, wherein the secondary combustion system includes a plurality of injectors.

45. The turbine containing system according to claim 44, wherein the plurality of injectors are spatially distributed in the stream of combustion products of the primary combustion system.

46. The turbine containing system according to claim 45, wherein the plurality of injectors include a combination of long injectors and short injectors.

47. The turbine containing system according to claim 46, wherein the long and short injectors are alternating.

48. The injector according to claim 38, further including a fuel circulation prevention means.

49. The injector according to claim 38, further including an inner wall for defining a coolant passage.

50. The injector according to claim 49, further including a mixer-containing element between said wall and said inner wall.

51. The injector according to claim 50, wherein said mixer-containing element between the wall and inner wall defines a second coolant passage.

52. The injector according to claim 51, further including a communications passage in the mixer-containing element between said coolant passage and said second coolant passage.

53. The injector according to claim 50, further including mixing passages for communicating a coolant to said exit.

54. The injector according to claim 53, wherein an axis of the mixing passage is substantially perpendicular to an axis of the exit.

55. The injector according to claim 54, wherein a diameter of the exit is greater than the diameter of the mixing passage.

56. The injector according to claim 54, wherein a diameter of the mixing passage providing the coolant is greater than a diameter of an entrance providing fuel to the exit.

57. The injector according to claim 54, wherein a length of the exit is between about 1–10 diameters of an entrance providing fuel to the exit.

58. The injector according to claim 57, wherein the length is between about 3–7 diameters of the entrance providing fuel to the exit.

59. The injector according to claim 58, wherein the exit is about 5 diameters of the entrance providing fuel to the exit.

60. The injector according to claim 59, wherein the coolant passage is adjacent to the wall.

61. The injector according to claim 59, further including holes for creating a cooling film on an outer surface of said injector.

62. The injector according to claim 38, wherein the wall tapers.

63. The injector according to claim 38, further including an area-decreasing member.

64. The injector according to claim 38, wherein there is a plurality of exits for communication between the fuel mixture passage and the stream of the primary combustion products.

65. The injector according to claim 64, wherein the plurality of exits are configured so as to provide a fuel mass proportional to the oxidants in a region of the injector location.

66. The injector according to claim 65, wherein the plurality of exits are set at a pre-selected exit spacing.

67. The injector according to claim 65, wherein the plurality of exits are set at a pre-selected distribution of exit diameters.

68. The injector according to claim 65, wherein the plurality of exits are set at a pre-selected exit spacing and a pre-selected exit diameter distribution.

69. The injector according to claim 38, further including a turning angle.

70. The injector according to claim 38, wherein an inscribed circle diameter of a leading edge and a length from the leading edge to a trailing edge has an aspect ratio (d/l) between about 1 and 12.

71. The injector according to claim 70, wherein the aspect ratio (d/l) is between about 1 and 2.

72. The injector according to claim 71, wherein the aspect ratio (d/l) is about 1.4.

73. A method for reducing NOx emissions of turbine containing system, the method comprising:
(a) providing a turbine containing system comprising
  (i) an intake section,
  (ii) a compressor section downstream from the intake section,
  (iii) a combustor section having a primary combustion system downstream from the intake section, (iv) a turbine section, and
(v) an exhaust section; and
(b) providing a secondary combustion system downstream from the primary combustion system, said secondary combustion system including an injector for transversely injecting a secondary fuel mixture into a stream of combustion products of the primary combustion system, said injector including:
  (i) a coupling,
  (ii) a wall circumscribing a fuel mixture passage wherein an area defined by the wall decreases as a distance from the coupling increases, and
  (iii) at least one exit for communicating between said fuel mixture passage and said stream of primary combustion products.

74. A method for reducing NOx emissions of turbine containing system, the method comprising:
(a) providing a turbine containing system comprising
  (i) an intake section,
  (ii) a compressor section downstream from the intake section,
  (iii) a combustor section having a primary combustion system downstream from the intake section,
  (iv) a turbine section, and
  (v) an exhaust section; and
(b) providing a secondary combustion system downstream from the primary combustion system, said secondary combustion system including an injector for transversely injecting a secondary fuel mixture into a stream of combustion products of the primary combustion system, and injector including:
  (i) a coupling,
  (ii) a wall defining an airfoil shape circumscribing a fuel mixture passage, wherein an area defined by the wall decreases as a distance from the coupling increases, and
  (iii) at least one exit for communicating between said fuel mixture passage and said stream of primary combustion products.

75. A method for reducing NOx emissions of turbine containing system, the method comprising:
(a) providing a turbine containing system comprising
  (i) an intake section,
  (ii) a compressor section downstream from the intake section,
  (iii) a combustor section having a primary combustion system downstream from the intake section,
  (iv) a turbine section,
  (v) an exhaust section, and
  (vi) a load; and
(b) providing a secondary combustion system downstream form the primary combustion system, said secondary combustion system including an injector for transversely injecting a secondary fuel mixture into a stream of combustion products of the primary combustion system, said injector including:
  (i) a coupling,
  (ii) a wall defining an airfoil shape circumscribing a fuel mixture passage, wherein an area defined by the wall decreases as a distance from the coupling increases, and
  (iii) at least one exit for communicating between said fuel mixture passage and said stream of primary combustion products.

* * * * *